VAN BUREN MARTIN.
RUNNING GEAR.
APPLICATION FILED MAR. 5, 1909.
997,631.
Patented July 11, 1911.
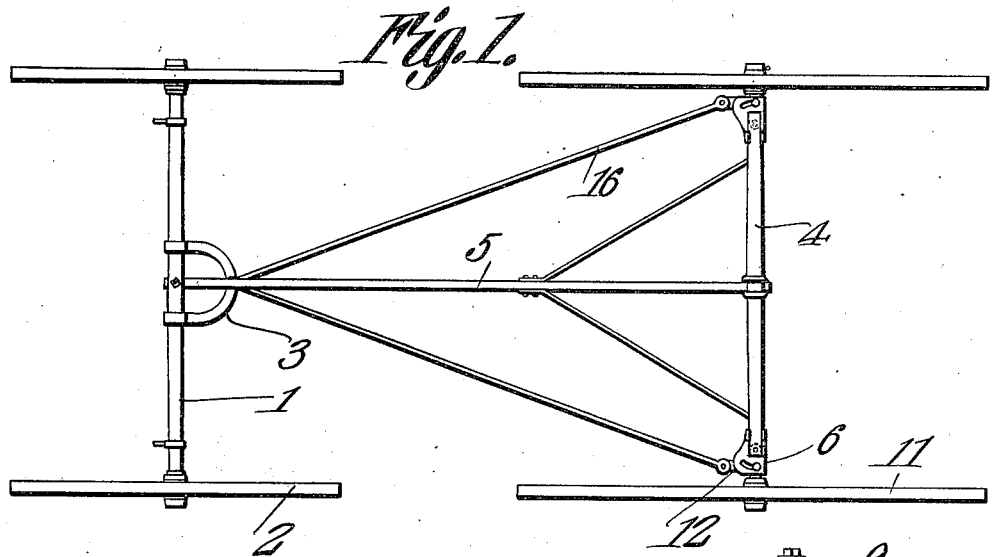
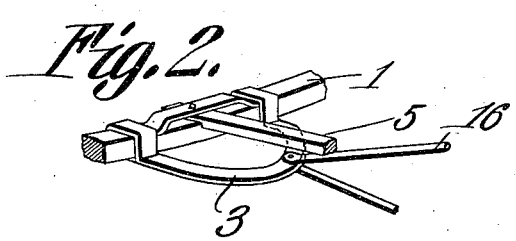
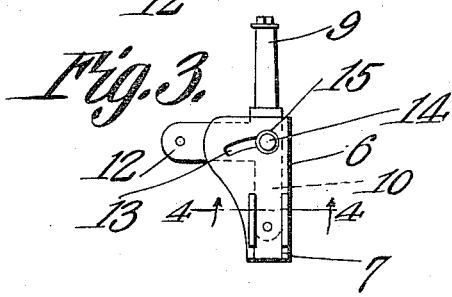
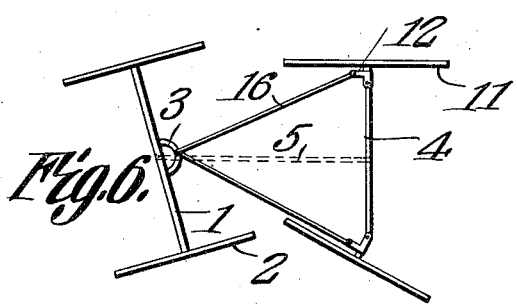
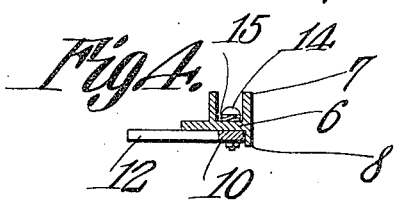
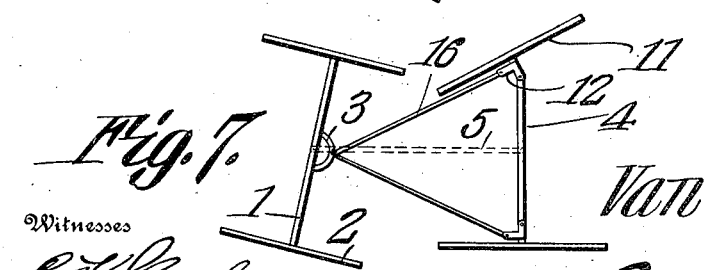

UNITED STATES PATENT OFFICE.

VAN BUREN MARTIN, OF MOBERLY, MISSOURI, ASSIGNOR, BY DIRECT AND MESNE ASSIGNMENTS, OF ONE-HALF TO LILLIE M. PERRINE, ONE-FOURTH TO JAMES E. HAMPTON, AND ONE-FOURTH TO CHARLES E. MILES, ALL OF MOBERLY, MISSOURI.

RUNNING-GEAR.

997,631.        Specification of Letters Patent.        Patented July 11, 1911.

Application filed March 5, 1909. Serial No. 481,215.

*To all whom it may concern:*

Be it known that I, VAN B. MARTIN, a citizen of the United States, residing at Moberly, in the county of Randolph and State of Missouri, have invented a new and useful Running-Gear, of which the following is a specification.

This invention has relation to running gears, and it consists in the novel construction and arrangement of its parts, as hereinafter shown and described.

The object of the invention is to provide, in a running gear, a series of supporting wheels so connected together that when a turn is made three of the wheels will swing in vertical planes with relation to the reach of the running gear, while the fourth wheel is held approximately at its normal position parallel with relation to the reach. By providing such an arrangement the running gear may accomplish a short turn, and, at the same time, the wheel which is held at its approximate normal position will steady the structure while the turn is being made.

With the above object in view the structure comprises front and rear axles, which are connected together by a reach pole in the usual manner, the said pole being fixed to the rear axle and pivotally connected at its forward end with the front axle. Wheels are journaled for rotation at the ends of the front axle, and spindles are pivotally mounted at the extremities of the rear axle, and upon the said spindles wheels are journaled. A rearwardly disposed bracket is attached to the front axle, and is located concentrically with relation to the pivotal connection between the forward end of the reach pole and the said axle. Connecting rods are pivotally attached at their forward ends with the rear portion of the said bracket, and the said rods extend at their rear ends upon opposite sides of the reach pole and are connected with the spindles located at the end portions of the rear axle.

In the accompanying drawing:—Figure 1 is a plan view of the running gear. Fig. 2 is a perspective view of the intermediate portion of the front axle of the running gear and attached parts. Fig. 3 is a top plan view of one of the spindles mounted at the end of the rear axle. Fig. 4 is a transverse sectional view of the spindle, cut on the line 4—4 of Fig. 3. Fig. 5 is an edge elevation of a spring washer used in connection with a retaining bolt mounted upon the spindles. Fig. 6 is a diagrammatic view, showing the relative positions of the wheels when the running gear is turned in one direction. Fig. 7 is a diagrammatic view, showing the relative positions of the supporting wheels when the running gear is turned in the direction opposite from that in which it is turning as illustrated in Fig. 6.

The running gear comprises a front axle 1, to the ends of which are journaled the supporting wheels 2. A rearwardly disposed bracket 3 is attached to the intermediate portion of the axle 1, and the said axle 1 is connected at its middle with the middle of a rear axle 4 by means of a reach pole 5, which is fixed at its rear end to the rear axle and pivotally connected at its forward end with the axle 1. The bracket 3 is concentrically arranged with relation to the pivotal connection between the forward end of the reach pole 5 and the axle 1. Plates 6 are attached to the extremities of the rear axle 4 and are held in fixed position with relation thereto by means of the flanges 7 which project up along the forward and rear sides of the end portions of the said axle 4. Each of the plates 6 is provided upon its under side and at its rear edge with a depending flange 8. Each spindle 9 is provided with a shank portion 10 and the shank portions 10 of the said spindles are pivotally attached to the under sides of the plates 6, and the rear edges of the said shanks at times are held to bear against the front faces of the depending flanges 8 carried by the said plates 6. Rear wheels 11 are journaled for rotation upon the spindles 9, and each spindle is provided at its forward edge with a forwardly disposed lug or projection 12. The plates 6 are provided with arcuate slots 13, which receive shank portions of pins 14 mounted upon the shanks 10 of the spindles 9. The said slots 13 are approximately concentrically arranged with relation to the pivotal connection between the shanks 10 of the spindles and the plates 6, and below the head of each pin 14 and above the upper surface of the plates 6 is inserted a spring washer 15, for the purpose of holding the parts in close relation to each other and to prevent rattling. Rods 16 are pivotally connected at their rear ends with the forward extremities of the lugs 12, and the forward ends of the said rods 16 are pivoted to the rear portion of the bracket 3, the pivotal points of both forward ends of the said rods 16 being in common.

From the above description of the arrangement of parts it is apparent that when the running gear is moving in a straight forward direction, the rear wheels 11 will be held alined with the front wheels 2, or approximately so, and that when the axle 1 is swung to cause the running gear to turn to one side or the other the front wheels 2 will be swung out of alinement with the rear wheels, and, through one of the rods 16, one of the rear wheels will be swung decidedly out of parallel relation with the reach pole 5, while the other rear wheel 11 during the time that the other rod 16 is subjected to thrust strain will be retained approximately in parallel relation with the longitudinal dimension of the said reach pole 5. Figs. 6 and 7 of the drawing illustrate approximately the relative positions of the wheels when the running gear is turned to one side or the other. Inasmuch as the rearward movement of the spindle is limited by the lugs 8 carried by the plates 6 to a position in alinement or approximately so with the rear axle 4, the said spindle cannot swing to any considerable extent behind the axle, and consequently when the running gear is turning for instance to the right the rear wheel 11 at the left end of the axle 4 is held approximately in parallel relation with the reach pole 5 so long as the adjacent rod 16 is subjected to thrust, while the rear wheel 11 at the right end of the axle 4 swings into a plane at an acute angle to the longitudinal dimension of the said reach pole 5. Thus the rear wheel that swings decidedly out of its normal relation with the reach pole facilitates the short turning of the running gear, while that rear wheel 11 which is held approximately in its normal position with relation to the reach pole steadies the structure upon the ground during the act of turning.

It is obvious that when the running gear is turned in the opposite direction from the example last above given, the rear wheel 11 at the right end of the axle 4 so long as it is subjected to the conditions mentioned above in connection with rear wheel 11 at the left will retain approximately its normal position, while the rear wheel 11 at the left end of the said rear axle 4 will swing into a decided abnormal position, as illustrated in Fig. 6 of the drawing. If during such movement there should be any tendency to cramping or binding of the parts, sufficient looseness at the joints, or flexibility of parts may be provided to overcome the same.

Throughout this description it has been stated that when one of the rear wheels 11 of the running gear is swung out of its normal position with relation to the reach pole that it is swung " decidedly." By this term " decidedly " is meant that the wheel is swung perceptibly and effectually out of parallel relation to the reach pole. Again it has been stated that when one of the rear wheels is swung decidedly out of its normal position that its other rear wheel is retained " approximately " at its normal position with relation to the reach pole. By this term " approximately " is meant that the axis of the wheel remains in a position at a right angle to the reach pole or the said wheel swings to such a slight and imperceptible extent as to all intent and purpose retain the said position in so far as accomplishing the desired result is concerned. The desideratum is to retain the axis of the said wheel at a right angle to the reach, but should conditions prevail that render this impossible or improbable the said wheel may be permitted to swing slightly to overcome said conditions without affecting to any perceptible degree the operation of the running gear as an entity to accomplish a short turn.

Having described my invention, what I claim as new, and desire to secure, by Letters Patent, is:—

1. A running gear comprising front and rear axles, a reach pole fixed to the rear axle and pivotally connected to the front axle, wheels journaled at the extremities of the front axle, spindles pivotally mounted at the extremities of the rear axle, wheels journaled upon the spindles, and means connecting said spindles with the front axle whereby one of the rear wheels is swung to a decidedly abnormal position when the front axle is swung upon its pivot with relation to the reach pole as the structure makes a turn and the other rear wheel is retained approximately at its normal position with relation to the reach pole.

2. A running gear comprising front and rear axles, a reach pole fixed with relation to the rear axle and pivotally connected with the front axle, wheels journaled at the extremities of the front axle, spindles pivotally attached at the extremities of the rear axle, wheels journaled upon the spindles, a bracket extending rearwardly from the front axle and being concentrically arranged with relation to the pivotal connection between the forward end of the reach pole and the front axle, and rods pivotally attached at their forward ends to the said bracket and pivotally connected at their rear ends with the said spindles.

3. A running gear comprising front and rear axles, a reach pole fixed to the rear axle and pivotally connected with the front axle, wheels journaled at the extremities of the front axle, spindles pivotally mounted at the extremities of the rear axle, wheels journaled upon said spindles, means for limiting the rearward swinging movement of the spindles with relation to the rear axle, a bracket extending rearwardly from the front axle, and rods pivotally connected at their forward ends with the said bracket and pivotally connected at their rear ends with the said spindles.

4. A running gear comprising front and rear axles, a reach pole fixed with relation to the rear axle and pivotally connected with the front axle, wheels journaled at the extremities of the front axle, spindles pivotally mounted at the extremities of the rear axle, wheels journaled upon the spindles, depending flanges carried by the rear axle for limiting the rearward swinging movement of the spindles, a bracket extending rearwardly from the front axle, and rods pivotally connected at their forward ends with the bracket, and pivotally connected at their rear ends with the said spindles.

In testimony that I claim the foregoing as my own, I have hereto affixed my signature in the presence of two witnesses.

VAN BUREN MARTIN.

Witnesses:
W. F. JEFFRIES,
W. E. PARTRIDGE.

---

Copies of this patent may be obtained for five cents each, by addressing the "Commissioner of Patents, Washington, D. C."